United States Patent
Knapke et al.

(10) Patent No.: US 9,126,460 B2
(45) Date of Patent: Sep. 8, 2015

(54) TIRE INFLATION SYSTEM HAVING A SLEEVE SHAPED AIR PASSAGE

(71) Applicant: Dana Heavy Vehicle Systems Group, LLC, Maumee, OH (US)

(72) Inventors: Brian V. Knapke, Toledo, OH (US); Lloyd G. Racine, Madison Heights, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 410 days.

(21) Appl. No.: 13/778,501

(22) Filed: Feb. 27, 2013

(65) Prior Publication Data

US 2013/0228258 A1    Sep. 5, 2013

Related U.S. Application Data

(60) Provisional application No. 61/605,881, filed on Mar. 2, 2012.

(51) Int. Cl.
| | |
|---|---|
| B60C 23/10 | (2006.01) |
| B60C 23/00 | (2006.01) |
| B60B 35/00 | (2006.01) |

(52) U.S. Cl.
CPC ............... *B60C 23/003* (2013.01); *B60B 35/00* (2013.01)

(58) Field of Classification Search
CPC ............................ B60C 23/003; B60C 23/001
USPC ..................................................... 15/415–417
See application file for complete search history.

(56) References Cited

U.S. PATENT DOCUMENTS

| | | | |
|---|---|---|---|
| 4,431,043 | A | 2/1984 | Goodell et al. |
| 4,492,019 | A | 1/1985 | Wells |
| 4,582,107 | A | 4/1986 | Scully |
| 4,730,656 | A | 3/1988 | Goodell |
| 4,733,707 | A | 3/1988 | Goodell et al. |
| 4,804,027 | A | 2/1989 | Runels |
| 4,892,128 | A | 1/1990 | Bartos |
| 5,080,156 | A | 1/1992 | Bartos |
| 5,147,494 | A | 9/1992 | Torii et al. |
| 5,174,839 | A | 12/1992 | Schultz et al. |
| 5,429,167 | A | 7/1995 | Jensen |
| 5,868,881 | A | 2/1999 | Bradley |
| 6,145,558 | A | 11/2000 | Schmitz |
| 6,182,727 | B1 | 2/2001 | Beesley |
| 6,668,888 | B1 | 12/2003 | Beesley et al. |
| 6,719,028 | B2 | 4/2004 | D'Amico et al. |

(Continued)

FOREIGN PATENT DOCUMENTS

| | | |
|---|---|---|
| EP | 0588595 A1 | 3/1994 |
| GB | 175303 A | 2/1922 |
| GB | 1293036 A | 10/1972 |

(Continued)

*Primary Examiner* — Jason Bellinger
(74) *Attorney, Agent, or Firm* — Marshall & Melhorn, LLC

(57) ABSTRACT

A tire inflation system for a vehicle includes an axle spindle having a radially outer surface and a radially inner surface, a sleeve having a radially inner surface, a radially outer surface, an inboard end portion and an outboard end portion with a flared end. A cavity is located between the radially inner surface of the axle spindle and the radially outer surface of the sleeve. The cavity being in fluid communication on an inboard end portion with a first rotary seal and in communication on an outboard end portion with a second rotary seal, wherein the flared end of the sleeve closes the cavity on the outboard end portion.

10 Claims, 1 Drawing Sheet

(56) References Cited

U.S. PATENT DOCUMENTS

| | | |
|---|---|---|
| 6,857,457 B2 | 2/2005 | Nienhaus |
| 7,690,412 B1 | 4/2010 | Jenkinson et al. |
| 7,896,045 B2 * | 3/2011 | Solie et al. .................. 152/417 |
| 2002/0112802 A1 * | 8/2002 | D'Amico et al. ............ 152/415 |
| 2010/0181739 A1 | 7/2010 | Eschenburg et al. |

FOREIGN PATENT DOCUMENTS

| | | |
|---|---|---|
| GB | 2178705 A | 2/1987 |
| WO | 2008063863 A2 | 5/2008 |

* cited by examiner

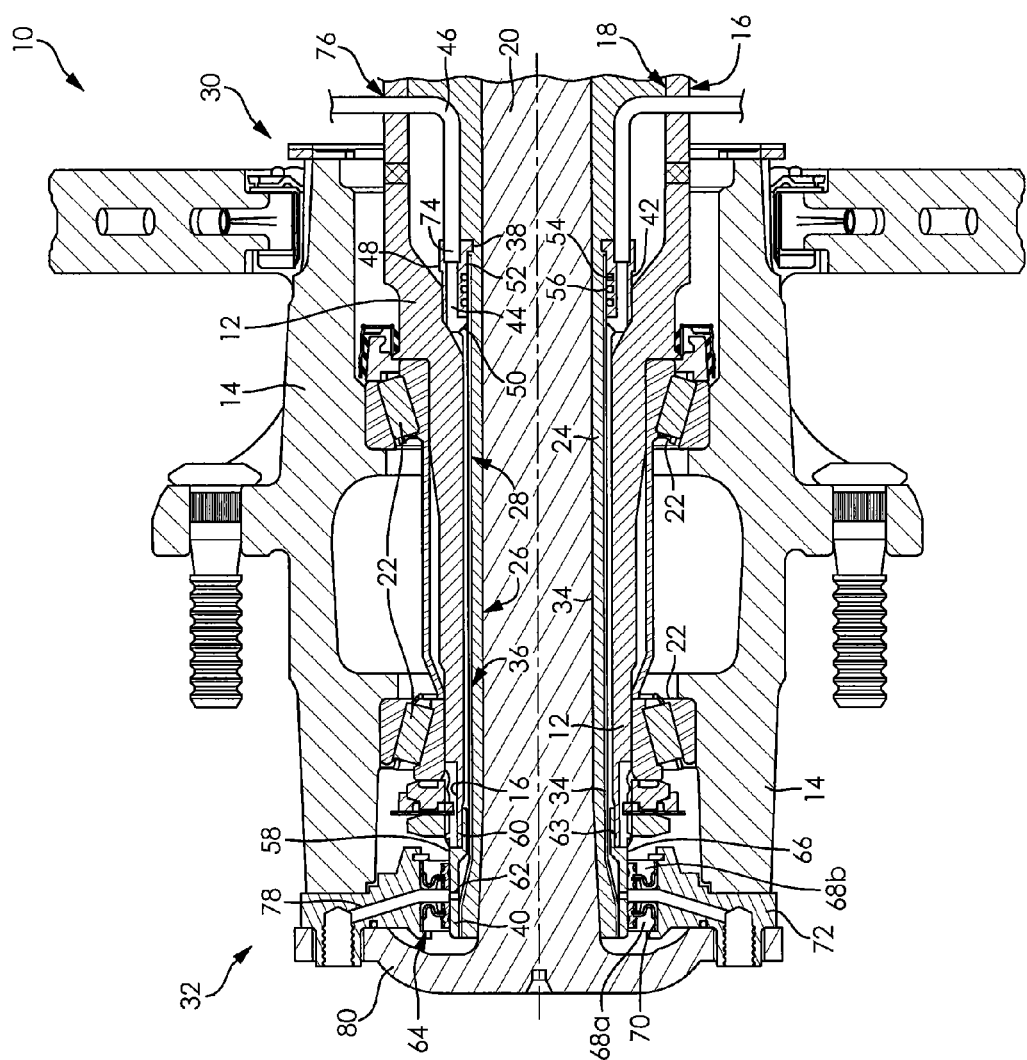

TIRE INFLATION SYSTEM HAVING A SLEEVE SHAPED AIR PASSAGE

RELATED APPLICATIONS

This application is a non-provisional application filed off of U.S. patent application Ser. No. 61/605,881 filed on Mar. 2, 2012, which is incorporated by reference in its entirety herein. This non-provisional application is being filed during the pendency of U.S. patent application Ser. No. 61/605,881.

FIELD OF THE INVENTION

The present invention relates to an improved structure for a tire inflation system for use in a vehicle.

BACKGROUND OF THE INVENTION

The invention relates to tire inflation systems for vehicles and, more particularly, to a tire inflation system that uses a cavity between an axle spindle and an axle shaft for a conduit for a pressurized fluid, such as air.

Tire inflation systems for vehicles are well-known and are used to provide a vehicle with versatility for differing terrain types or to reduce maintenance requirements. For example, a pressure of a plurality of tires in fluid communication with the tire inflation system may be lowered to provide additional traction for the vehicle and may be raised to reduce a rolling resistance of the vehicle. Further, the vehicle having the tire inflation system eliminates a need to periodically check a pressure within each tire and eliminates a need to adjust the pressure within each tire when the pressure within each tire requires adjustment as desired.

Tire inflations systems typically are not installed on drive axles due to increased complexities, spacing requirements, and cost. Unless the tire inflation system is wholly mounted on a wheel in communication with the system, a rotary seal must be employed to permit a fluid communication between a pump and each tire included in the tire inflation system, for example. When the tire inflation system is employed on a drive axle, an axle housing may be used as a portion of the conduit for the pressurized fluid or the conduit may be routed outside of the axle housing. When the axle housing of a drive axle is employed as the portion of the conduit for the pressurized fluid, additional rotary seals may be necessary to prevent interference with a differential lubricant, for example. Alternately, when the conduit is routed outside of the axle housing, the rotary seal may become unnecessarily large.

It would be advantageous to develop a tire inflation system that uses a cavity between an axle spindle and an axle shaft for a conduit for a pressurized fluid that requires a single rotary seal, may be used with a drive axle, and reduces a complexity of the tire inflation system.

SUMMARY OF THE INVENTION

A tire inflation system for a vehicle comprised of an axle spindle having a radially outer surface and a radially inner surface. The system also comprises a sleeve having a radially inner surface, a radially outer surface, an inboard end portion and an outboard end portion, wherein the outboard end portion of the sleeve has a flared end. A cavity is located between the radially inner surface of the axle spindle and the radially outer surface of the sleeve. The cavity is in communication on an inboard end portion with a first rotary seal and in communication on an outboard end portion with a second rotary seal. The flared end of the sleeve closes the cavity on the outboard end portion.

Various objects and advantages of this invention will become apparent to those skilled in the art from the following detailed description of the preferred embodiments, when read in light of the accompanying drawing.

BRIEF DESCRIPTION OF THE DRAWING

The above, as well as other advantages of the present invention, will become readily apparent to those skilled in the art from the following detailed description when considered in the light of the accompanying drawings in which:

FIG. 1 is a partial cut-away side view.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawing, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

FIG. 1 illustrates a tire inflation system 10 fitted to an axle spindle 12 and a wheel hub assembly 14, according to an embodiment of the invention. The axle spindle 12 comprises a radially outer surface 16, a radially inner surface 18. The axle spindle 12 is a hollow member into which an axle shaft 20 is rotatingly disposed through. The axle spindle 12 may be formed unitarily with an axle housing (not shown) or the axle spindle 12 may be separately formed and comprise a component of an axle assembly.

The wheel hub assembly 14 is rotatingly disposed about the axle spindle 12 in a conventional manner using bearings 22. The wheel hub assembly 14 is conventional and well known in the art. The wheel hub assembly 14 may be configured to hold one or more wheels.

As shown in FIG. 1, a sleeve 24 is disposed within the axle spindle 12 about the axle shaft 20. The sleeve 24 is a tubular, hollow elongate member comprising a radially inner surface 26, a radially outer surface 28, an inboard end portion 30 and an outboard end portion 32; wherein the outboard end portion 32 is flared. An outer diameter of the flared outboard end portion 32 is greater than an outer diameter of a remaining portion 34 of the sleeve 24. The remaining portion 34 of the sleeve 24 has a substantially constant diameter. An outer diameter of the remaining portion 34 of the sleeve 24 is less than an inside diameter of the axle spindle 12. Thus, it can be appreciated that the remaining portion 34 of the sleeve 24 extends axially out from the spindle 12 while the remaining portion 34 is disposed with the axle spindle 12.

Further, when the sleeve 24 is disposed in the axle spindle 12, a cavity 36 is located between the radially inner surface 18 of the axle spindle 12 and the radially outer surface 28 of the sleeve 24. The length of the cavity 36 is substantially equal to the length of the axle spindle 12 and the sleeve 24. The cavity 36 is in communication on an inboard end with a first rotary seal 38 and in communication on an outboard end with a second rotary seal 40.

The first rotary seal 38 is an annular body disposed in the axle spindle 12. As shown in FIG. 1, the first rotary seal 38 is a ring shaped body formed from a machined metal. However, it is understood that the first rotary seal 38 may have other shapes and may be formed from other materials. A radially outer surface 42 of the first rotary seal 38 sealingly engages the radially inner surface 18 of the axle spindle 12. As shown in FIG. 1, the first rotary seal 38 is press fit into a recess of the axle spindle 12 defined by the radially inner surface 18 of the axle spindle 12. However, it is understood that the radially outer surface 42 of the first rotary seal 38 may be in threading engagement with the radially inner surface 18 of the axle spindle 12. Further, it is understood that a weld may be formed between the first rotary seal 38 and the axle spindle 12, or that a sealant may be disposed between the first rotary seal 38 and the axle spindle 12, or that the first rotary seal 38 may be integrally formed with the axle spindle 12.

The first rotary seal 38 includes a sealing ring conduit 44 formed therein. The sealing ring conduit 44 is a hollow channel formed entirely through the first rotary seal 38 in the axial direction. The sealing ring conduit 44 is in fluid communication with a primary conduit 46. An inlet 48 of the sealing ring conduit 44 is formed on an inboard end of the first rotary seal 38. The primary conduit 46 may fit with and into the inlet 48 of the sealing ring conduit 44 to facilitate fluid communication from the primary conduit 46, through the inlet 48, into the sealing ring conduit 44.

As shown in FIG. 1, an outlet 50 of the sealing ring conduit 44 is formed on an outboard end of the first rotary seal 38 and a radially inner surface 52 of the sealing ring conduit 44. Alternatively, the outlet 50 of the sealing ring conduit 44 may be formed in one of the outboard side of the first rotary seal 38 and the radially inner surface 52 of the sealing ring conduit 44.

At least one annular groove 54 is formed on the radially inner surface 52 of the sealing ring conduit 44. As shown in FIG. 1, the radially inner surface 52 of the sealing ring conduit 44 includes three annular grooves 54 formed therein; however, it is understood that any number of annular grooves 54 may be formed on the radially inner surface 52 of the sealing ring conduit 44. An o-ring 56 is disposed in each of the annular grooves 54; however, it is understood that other sealing may be disposed adjacent or coupled to the first rotary seal 38.

The second rotary seal 40 is an annular body disposed adjacent an outboard end or wheel end of the axle spindle 12. As shown in FIG. 1, the second rotary seal 40 is a ring shaped body formed from a machined metal. However, it is understood that the second rotary seal 40 may have other shapes and may be formed from other materials. A portion of an inboard surface 58 of the second rotary seal 40 sealingly engages a portion of an outboard surface 60 of the axle spindle 12. As shown in FIG. 1, the second rotary seal 40 is press fit into the outboard end of the axle spindle 12 defined by the outboard surface 60 of the axle spindle 12 and the radially outer surface 28 of the sleeve 24. The radially inner surface 18 of the axle spindle 12 or the radially outer surface 16 of the axle spindle 12 may be in threading engagement with the second rotary seal 40. Alternatively a weld may be formed between the second rotary seal 40 and the axle spindle 12 and/or that a sealant may be disposed therebetween. The second rotary seal 40 includes an inboard engagement surface 63 in sealing engagement with the radially outer surface 28 of the sleeve 24 and the radially inner surface 18 of the axle spindle 12, on each of their outboard ends, and at least one ring perforation 62 formed therethrough. The at least one ring perforation 62 provides a radially extending port allowing fluid communication through an inner face 70 into a rotary seal interface member 72.

A third rotary seal 64 is disposed on an outer surface 66 of the second rotary seal 40 and is in dynamic sealing engagement therewith. As shown in FIG. 1, the third rotary seal 64 includes two seals 68a and 68b, mechanically held in place, and disposed on opposite sides of the ring perforation 62. The third rotary seal 64 is in fixed sealing engagement with the inner face 70 of the rotary seal interface member 72; however, it is understood that the third rotary seal 64 may be in dynamic sealing engagement with the inner face 70 of the rotary seal interface member 72 and in fixed sealing engagement with the outer surface 66 of the second rotary seal 40 or the third rotary seal 64 may be in dynamic sealing engagement with both the inner face 70 of the rotary seal interface member 72 and the outer surface 66 of the second rotary seal 40.

The rotary seal interface member 72 is a disc shaped member fixedly disposed between an outboard end of the wheel hub assembly 14 and a flange 80 located on the outboard end of the axle shaft 20. The rotary seal interface member 72 is formed from a rigid material. The ring perforation 62 in the rotary seal interface member 72 alines with a secondary conduit 78. It is understood that the rotary seal interface member 72 may be integrally formed with the axle shaft 20.

The secondary conduit 78 facilitates fluid communication from the rotary seal interface member 72. An outboard end of the secondary conduit 78 formed in the rotary seal interface member 72 is adapted to receive a fitting, such as by having threads formed therein. As shown in FIG. 1, the portion of the tire inflation system 10 includes one secondary conduit 78; however, it is understood that the rotary seal interface member 72 may include a plurality of conduits formed therein.

A hose assembly (not shown) is fitted to the outboard end of the secondary conduit 78. The hose assembly is typically flexible and includes a first fitting for engaging the secondary conduit 78, a second fitting for engaging a tire valve (not shown), and a length of hose for affording fluid communication between the first fitting and the second fitting.

A wheel (not shown) including a rim, a tire sealingly disposed on the rim, and the tire valve is coupled to the wheel hub assembly 14 as known in the art. The tire valve is disposed through a portion of the rim to facilitate fluid communication with an interior of the tire. The tire valve operates as a check valve and opens when the pressure in the hose assembly is greater than a pressure in the tire. The second fitting of the hose assembly is fitted to the tire valve to facilitate fluid communication between the secondary conduit 78 and the interior of the tire.

The wheel hub assembly 14 and a rotary seal interface member 72 are drivingly engaged with the axle shaft 20 using a plurality of fasteners (not shown) passing through the flange 80 on the outboard end of the axle shaft 20 and the rotary seal interface member 72. Additionally, the flanged outboard end portion 32 of the sleeve 24 on the outboard end portion of the axle shaft 20 closes the cavity 36 on the outboard end portion.

The primary conduit 46 is partially illustrated in FIG. 1. The primary conduit 46 forms a fluid passage capable of directing a fluid from a pressurized fluid source (not shown), such as a pump, for example, to a distal end 74 of the primary conduit 46. The distal end 74 of the primary conduit 46 is in fluid communication with the first rotary seal 38, through the sealing ring conduit 44. The primary conduit 46 may be a rigid conduit or a flexible conduit. As shown in FIG. 1, the primary conduit 46 is disposed through a spindle aperture 76 formed in the axle spindle 12.

In use, the portion of the tire inflation system 10 facilitates fluid communication between the primary conduit 46 and the hose assembly. When a fluid is pumped into or a pressure is applied to the primary conduit 46, the fluid travels through or the pressure is applied to the sealing ring conduit 44 of the first rotary seal 38, the cavity 36 formed between the sleeve 24 and the axle spindle 12, the ring perforation 62 of the second rotary seal 40, between the seals 68a and 68b of the third rotary seal 64, and the secondary conduit 78 formed in the rotary seal interface member 72.

When the sleeve 24 is disposed in the axle spindle 12, a radially outer surface 28 of the sleeve 24 sealingly engages the O-rings 56 disposed in each of the annular grooves 54 and the flared outboard end portion 32 of the sleeve 24 sealingly engages the second rotary seal 40 closing the cavity 36 on the outboard end.

A pump (not shown) capable of pumping the fluid into or applying a pressure to the primary conduit 46 is activated by a controller (not shown) in response to a pressure within the tire as determined by a pressure sensor (not shown) in communication with the controller. Alternately, the pump may be activated manually by an operator of a vehicle the tire inflation system 10 is incorporated in, at periodic intervals to ensure each of the wheels is maintained at a desired pressure, in response to changes in ambient temperature, or in response to changes in terrain.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tire inflation system for a vehicle, comprising:
   an axle spindle having a radially outer surface and a radially inner surface;
   a sleeve having an radially inner surface, a radially outer surface, an inboard end portion and an outboard end portion, said outboard end portion having a flared end;
   a cavity located between said radially inner surface of said axle spindle and said radially outer surface of said sleeve, said cavity in communication on an inboard end portion with a first rotary seal and in communication on an outboard end portion with a second rotary seal; wherein said flared end of said sleeve closes said cavity on said outboard end portion.

2. A tire inflation system for a vehicle according to claim 1, wherein said sleeve is a tubular, hollow elongate member.

3. A tire inflation system for a vehicle according to claim 1, wherein an outer diameter of said flared outboard end portion of said sleeve is greater than an outer diameter of a remaining portion of said sleeve, and said remaining portion of said sleeve has a substantially constant diameter.

4. A tire inflation system for a vehicle according to claim 1, wherein a radially outer surface of said first rotary seal sealingly engages said radially inner surface of said axle spindle.

5. A tire inflation system for a vehicle according to claim 1, wherein said first rotary seal comprise a sealing ring conduit with at least one annual groove formed on a radially inner surface of said sealing ring conduit.

6. A tire inflation system for a vehicle according to claim 1, wherein said first rotary seal comprise a sealing ring conduit in fluid communication with a primary conduit, and said sealing ring conduit comprises an inlet on an inboard end of said first rotary seal and an outlet on an outboard end of said first rotary seal.

7. A tire inflation system for a vehicle according to claim 1, wherein a portion of an inboard surface of said second rotary seal sealingly engages a portion of an outboard surface of said axle spindle.

8. A tire inflation system for a vehicle according to claim 1, wherein said second rotary seal comprises an inboard engagement surface in sealing engagement with the radially outer surface of the sleeve and the radially inner surface of the axle spindle, on each of their outboard ends, and at least one ring perforation.

9. A tire inflation system for a vehicle according to claim 1, wherein a third rotary seal is disposed on an outer surface of said second rotary seal, and wherein said third rotary seal comprises two seals disposed on opposite sides of a ring perforation.

10. A tire inflation system for a vehicle according to claim 1, wherein a secondary conduit is in fluid communication with a rotary seal interface member in said second rotary seal.

\* \* \* \* \*